(12) United States Patent
Fink

(10) Patent No.: US 6,232,016 B1
(45) Date of Patent: May 15, 2001

(54) BATTERY TERMINAL FOR LEAD ACID BATTERY

(75) Inventor: Edwin A. Fink, Fleetwood, PA (US)

(73) Assignee: East Penn Manufacturing Company, Inc., Lyon Station, PA (US)

( * ) Notice: Subject to any disclaimer, the term of this patent is extended or adjusted under 35 U.S.C. 154(b) by 0 days.

(21) Appl. No.: 09/136,006

(22) Filed: Aug. 17, 1998

(51) Int. Cl.[7] ..................................................... H01M 2/02
(52) U.S. Cl. .......................... 429/178; 429/179; 429/180; 429/181
(58) Field of Search ................................. 429/178, 179, 429/180, 181

(56) References Cited

U.S. PATENT DOCUMENTS 4,898,796 * 2/1990 Furukawa et al. .................... 429/178
5,606,887 * 3/1997 Spiegelberg et al . ................ 72/357

* cited by examiner

*Primary Examiner*—Carol Chaney
*Assistant Examiner*—Angela J. Martin
(74) *Attorney, Agent, or Firm*—Zachary T. Wobensmith, III

(57) ABSTRACT

Battery terminals for side attachment lead acid batteries, which includes a metallic connector terminal encased or not encased in the battery top cover, which terminal receives an upstanding post from the battery cells, which post is joined to the connector by molten lead poured therein thorough an opening in the top cover, after which a snap in cover is provided to seal the opening for the encased terminal.

11 Claims, 2 Drawing Sheets

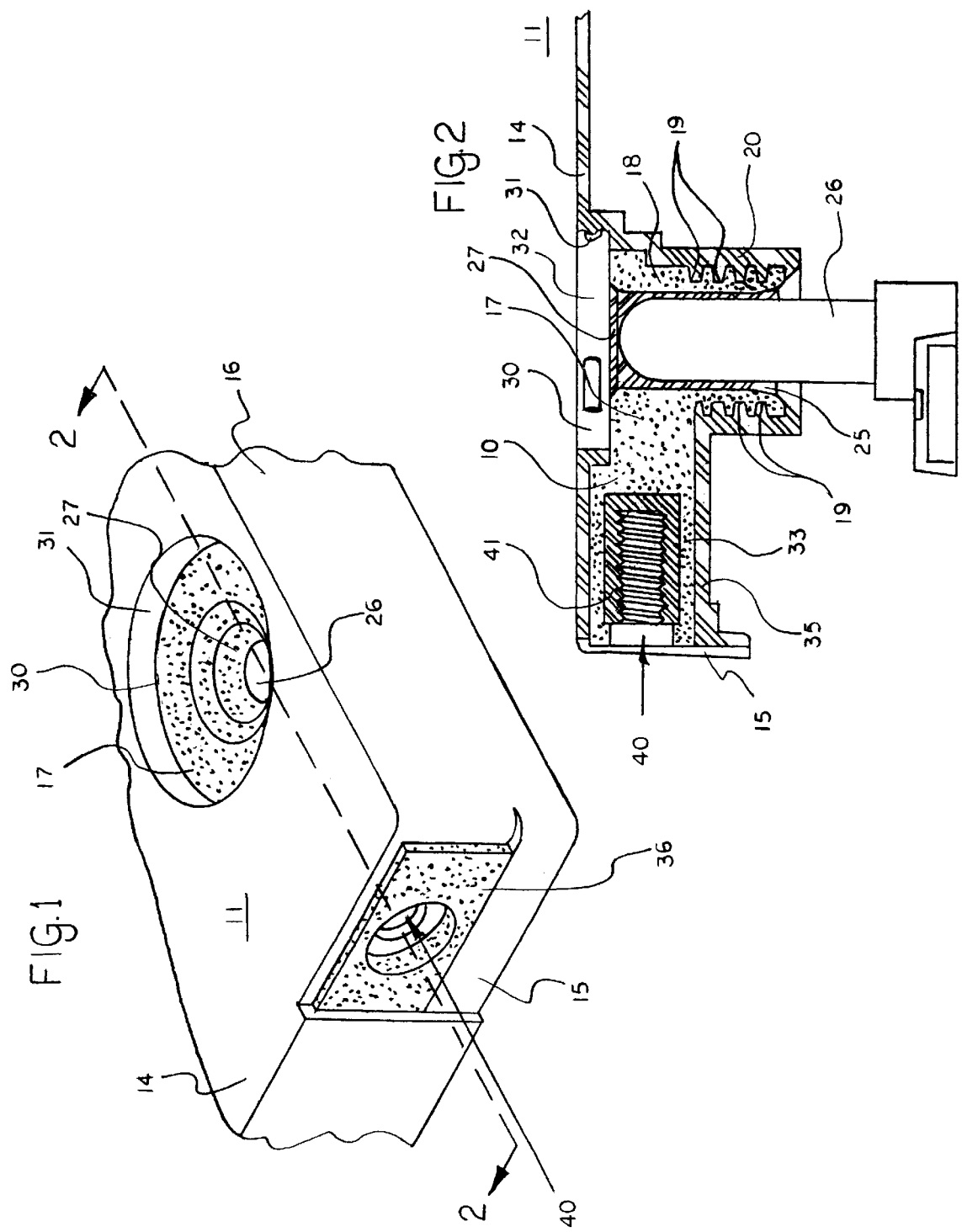

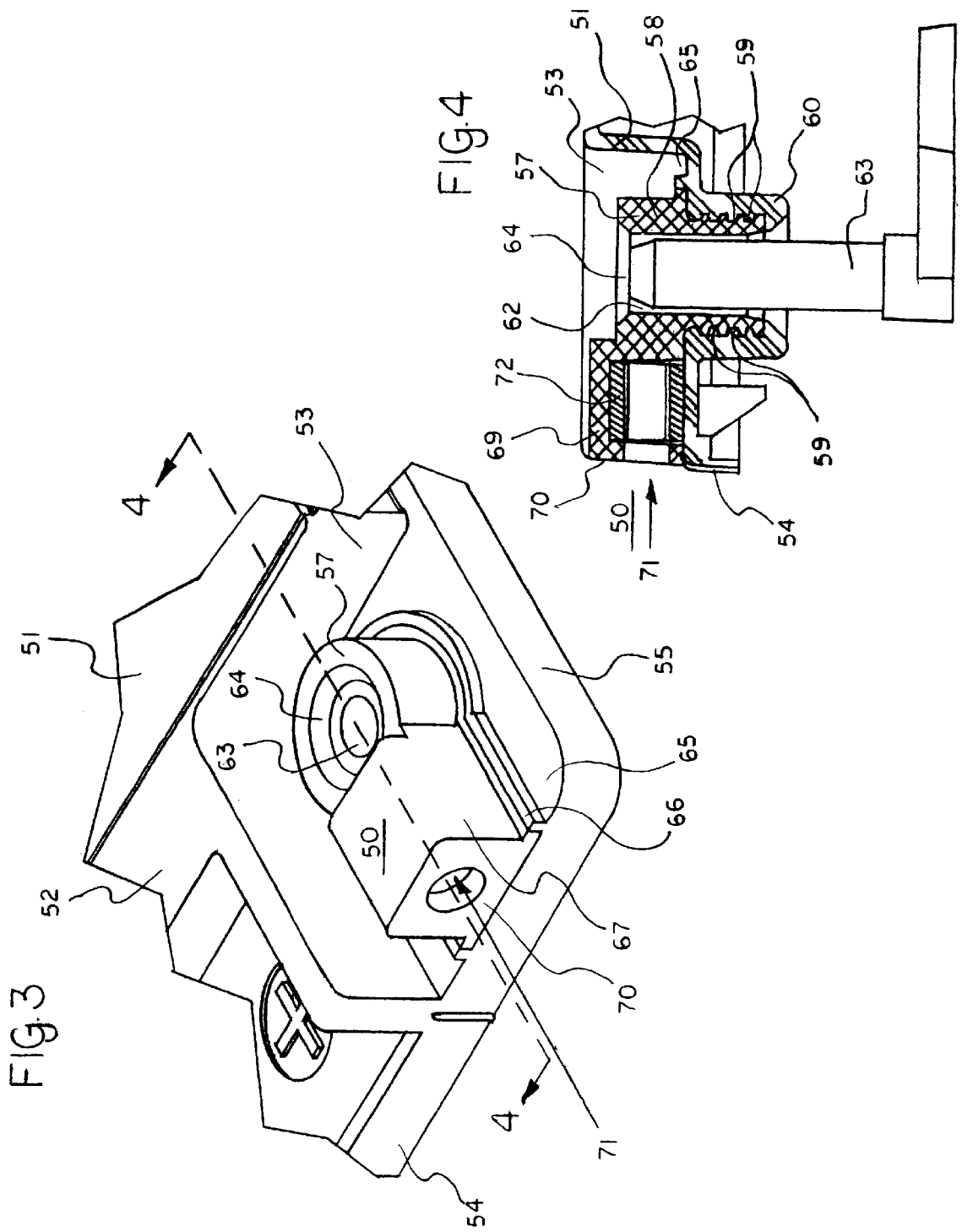

BATTERY TERMINAL FOR LEAD ACID BATTERY

BACKGROUND OF THE INVENTION

1. Field of the Invention

This invention relates to a side terminal battery connector for lead acid batteries of the flooded and valve regulated type, which is pre-molded, and is integral with the battery top cover.

2. Description of the Prior Art

Battery terminal connectors for lead acid batteries must meet many criteria. These terminals must be capable of being inexpensively mass produced, and easily assembled into battery covers. The terminals must withstand vibration and other forces associated with the attachment and detachment of battery cables, and they must not leak battery acid or gases. One of the most common problems with battery terminals is that the acid in the battery tends to creep between the terminal and the top cover, or the casing, and out of the battery where it comes into contact with the battery cables and other parts of the vehicle, causing corrosion and diminished electrical contact properties.

In small acid capacity batteries such as those used in motorcycles, the loss of acid and gases may lead to premature battery failure.

There have been many solutions proposed to solve acid leak and other problems such as shown in the U.S. patents to West U.S. Pat. No. 2,066,597; Shannon U.S. Pat. No. 3,605,065; Schaefer U.S. Pat. No. 3,413,593; Jennings, et al., U.S. Pat. No. 3,928,079; McEwan U.S. Pat. No. 4,693,948; Anderson, et al., U.S. Pat. No. 4,752,543; Furukawa, et al., U.S. Pat. No. 4,898,796; Uemichi, et al., U.S. Pat. No. 5,208,117; Mix, et al., U.S. Pat. No. 5,326,655; Inkmann, et al., U.S. Pat. No. 5,449,570; and Heiman, et al., U.S. Pat. No. 5,549,986, but none of them are entirely satisfactory.

The battery terminal of the invention does not suffer from the problems of the prior art and offers many positive advantages.

SUMMARY OF THE INVENTION

This invention relates to a battery terminal for lead-acid batteries which includes a main body of L-shape in cross section, which may be encased or not encased in the battery top cover, which terminal has an insert for side attachment of a battery cable, with a projection having a circular opening to receive a post from a battery cell, which may have a circular opening in the top cover for pouring molten lead to join the post and projection when the terminal is encased in the top cover, with the top cover opening closed off by a snap in cover.

The principal object of the invention is to provide a battery terminal for lead-acid batteries that does not leak battery acid or gases, and permits high rate battery discharges.

A further object of the invention is to provide a battery terminal that is pre cast.

A further object of the invention is to provide a battery terminal that is inexpensive to mass produce and easy to assemble into a battery.

A further object of the invention is to provide a battery terminal that is useful with a wide variety of flooded and valve regulated lead-acid batteries.

A further object of the invention is to provide a battery terminal that provides for side attachment of battery cables.

A further object of the invention is to provide a battery terminal that allows the use of a much larger post from a battery cell.

Other objects and advantageous features of the invention will be apparent from the description and claims.

DESCRIPTION OF THE DRAWINGS

The nature and characteristic features of the invention will be more readily understood from the following description taken in connection with the accompanying drawing, forming part hereof in which:

FIG. 1 is a perspective view of a portion of a battery cover which incorporates one embodiment of the battery terminal of the invention;

FIG. 2 is a vertical sectional view taken approximately on the line 2—2 of FIG. 1;

FIG. 3 is a view similar to FIG. 1 but of another embodiment of the battery terminal of the invention, and FIG. 4 is a vertical sectional view, in reduced scale, taken approximately on the line 4—4 of FIG. 3.

It should of course be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Referring now-more particularly to FIGS. 1 and 2 of the drawings one embodiment of a battery terminal 10 for lead acid batteries is therein illustrated.

The terminal 10 is universal, in that it can be connected to the negative or positive output of the battery cells, and is encased in the top cover 11 of a battery casing (not shown), which cover 11 is in fluid and gas tight relation with the casing. The cover 11 can be formed of any suitable moldable material with polypropylene being particularly suitable.

The cover 11, which is illustrated in fragmentary form includes a top panel 14, front panel 15 and side panel 16.

The battery terminal 10, which is preferably constructed of well known lead alloy, is formed by casting, is of L-shape in cross section, with a main body 17, which includes a downwardly extending projection 18 of cylindrical configuration, with a plurality of external grooves 19, which are encased in fluid and gas tight relation in a downward projection 20 of the top cover 11.

The projection 18 has an opening 25 therein, with a metallic post 26 from a cell (not shown) extending therein to provide electrical connection thereto, which cell is connected to a plurality of like cells (not shown). The opening 25 contains a ring of lead 27, which was poured therein in a molten state, and which joined post 26 and projection 18 when it solidified. The cover 11 has a circular opening 30 above opening 25, with a plurality of ribs 31 which engage a plate 32, which snaps therein to close off opening 30 after the lead ring 27 has been formed.

The terminal 10 has a leg 33 of rectangular configuration, which extends horizontally forwardly from main body 17, which is encased in the cover 11 between the top panel 14 and a bottom wall 35; which wall is integral with and extends from projection 20 to and is integral with front panel 15 of cover 11.

The leg 33 extends through front panel 15 and terminates at a flat front wall 36.

An opening 40 is provided in front wall 36, which communicates with a threaded insert 41 of well known type, which is integral with leg 33, and is intended to receive a bolt (not shown) from a battery cable (not shown) for connection to any electrical system. The insert 41 is preferably constructed of steel or other suitable conductive metal alloy.

Referring now more particularly to FIGS. 3 and 4, another embodiment of battery terminal 50 is therein illustrated.

The terminal 50 is universal in that it can be connected to the negative or positive output of the battery cells, and is engaged in the top cover 51 of a battery casing (not shown), which cover 51 is in fluid and gas tight relation with the casing. The cover 51 can be formed of any suitable moldable material with polypropylene being particularly suitable.

The cover 51, which is illustrated in fragmentary form includes a top panel 52, recess 53, front panel 54, and side panel 55.

The battery terminal 50, which is preferably constructed of well known lead alloy, is formed by casting, is of L-shape in cross section, with a main body 57 which includes a downwardly extending terminal projection 58 of cylindrical configuration, with a plurality of external grooves 59, which are encased in fluid and gas tight relation in a downward projection 60 of the top cover 51.

The terminal projection 58 has an opening 62 therein, with a metallic post 63 from a cell (not shown) extending therein to provide electrical connection thereto, which cell is connected to a plurality of like cells (not shown). The opening 62 contains a ring of lead 64, which was poured therein in a molten state, and which joined post 63 and terminal projection 58 when it solidified. The cover 51 has a recess 53 which is below the top of panel 52, with a flat surface 65, and an upstanding rib 66, which extends around main body 57 and around a leg 69 of rectangular configuration, which extends horizontally forwardly from main body 57, on flat surface 65 of cover 51 forwardly to front panel 54, where it terminates at a flat front wall 70.

An opening 71 is provided in front wall 70, which communicates with a threaded insert 72 of well known type, which is integral with leg 69, and is intended to receive a bolt (not shown) from a battery cable (not shown) for connection to any electrical system. The insert 72 is preferably constructed of steel or other suitable conductive metal alloy.

It will thus be seen that battery terminals have been provided with which the objects of the invention are achieved. 6

I claim:

1. A battery terminal for a lead acid battery which battery has a casing with a plurality of interconnected cells therein, a top cover connected to the casing in fluid and gas tight relation, and having a top panel, a front panel, and a side panel, which cells have positive and negative posts extending upwardly therefrom, the improvement which comprises an L-shaped precast one-piece battery terminal encased in said cover, said terminal having a main body with a downwardly extending circular projection, an opening in said terminal projection to receive one of said posts, a ring of lead in contact with said post and said terminal projection to electrically connect them together, said top cover having a downwardly extending projection encasing said terminal projection, a plurality of grooves in said terminal projection engaged in said cover projection in fluid and gas tight relation, a leg extending horizontally from said main body to and through said front panel of said top cover, and an opening in said leg, and a threaded insert in said leg for attachment of a battery cable thereto.

2. A battery terminal as defined in claim 1 in which said top cover has a circular opening above said terminal projection and a snap in plate in said circular opening.

3. A battery terminal as defined in claim 1 in which said leg is of rectangular configuration.

4. A battery terminal as defined in claim 1 in which said terminal is pre cast.

5. A battery terminal as defined in claim 1 in which said terminal is of lead alloy.

6. A battery terminal as defined in claim 1 in which said insert is of steel.

7. A battery terminal for a lead acid battery which battery has a casing with a plurality of interconnected cells therein, a top cover connected to the casing in fluid and gas tight relation, and having a top panel, a recess, a front panel, and a side panel, which cells have positive and negative posts extending upwardly therefrom, the improvement which comprises an L-shaped precast one piece battery terminal engaged in said cover, said terminal having a main body with a downwardly extending circular projection, an opening in said terminal projection to receive one of said posts, a ring of lead in contact with said post and said terminal projection to electrically connect them together, said top cover having a downwardly extending projection encasing said terminal projection, a plurality of grooves in said terminal projection engaged in said cover projection in fluid and gas tight relation, a leg extending horizontally from said main body on said recess to said front panel;

an upstanding rib from said recess extending around said main body and said leg to said front panel, and an opening in said leg, and a threaded insert in said leg for attachment of a battery cable thereto.

8. A battery terminal as defined in claim 7 in which said leg is of rectangular configuration.

9. A battery terminal as defined in claim 7 in which said terminal is pre cast.

10. A battery terminal as defined in claim 7 in which said terminal is of lead alloy.

11. A battery terminal as defined in claim 7 in which said insert is of steel.

* * * * *